United States Patent [19]

Boord

[11] Patent Number: 4,669,415

[45] Date of Patent: Jun. 2, 1987

[54] ALARM DEVICE FOR RESPIRATORS

[75] Inventor: Leslie F. Boord, Upper St. Clair, Pa.

[73] Assignee: Drägerwerk AG, Fed. Rep. of Germany

[21] Appl. No.: 794,624

[22] Filed: Nov. 4, 1985

[30] Foreign Application Priority Data

Nov. 3, 1984 [DE] Fed. Rep. of Germany ....... 3440215

[51] Int. Cl.[4] ...................... G01L 19/12; A01M 11/00

[52] U.S. Cl. ............................... 116/70; 116/DIG. 7; 116/DIG. 19; 128/202.22

[58] Field of Search ................... 116/24, 70, 108, 112, 116/137 R, 140, DIG. 7, DIG. 18, DIG. 19; 128/202.22, 204.22; 446/204-208, 216

[56] References Cited

U.S. PATENT DOCUMENTS

| | | | |
|---|---|---|---|
| 357,469 | 2/1887 | Davis | 116/137 R |
| 825,610 | 7/1906 | Olt | 446/208 |
| 1,030,639 | 6/1912 | Bodie | 116/137 R |
| 1,811,853 | 6/1931 | Landman | 116/140 |
| 2,626,585 | 1/1953 | Mendes | 116/137 R |

FOREIGN PATENT DOCUMENTS

| | | | |
|---|---|---|---|
| 397018 | 6/1924 | Fed. Rep. of Germany | 116/137 R |
| 2456189 | 8/1976 | Fed. Rep. of Germany | 116/70 |
| 166426 | 7/1921 | United Kingdom | 116/70 |
| 854194 | 11/1960 | United Kingdom | 116/70 |

*Primary Examiner*—Charles Frankfort
*Assistant Examiner*—W. Morris Worth
*Attorney, Agent, or Firm*—McGlew and Tuttle

[57] ABSTRACT

The dropping of pressure for the gas supply in respirators, below a minimum pressure, is reported to the wearer by an acoustic alarm device. To make it possible for the wearer to check whether a warning signal heard comes from his own equipment or not, it is provided that the alarm device has a manipulator which adjusts the sound-generating region.

6 Claims, 3 Drawing Figures

ALARM DEVICE FOR RESPIRATORS

FIELD AND BACKGROUND OF THE INVENTION

The invention relates to an alarm device for respirators with a connection for the pressure gas supply and a signal whistle arranged in a receiving part, and with a device for changing the acoustic signal.

Such alarm devices are known from German AS 24 56 189. There the alteration of the acoustic signal is achieved in that the gas supply is periodically opened and closed by way of a valve. so that a short succession of whistle tones warns the wearer of the respirator when the gas supply pressure has fallen below a certain level. The frequency of the whistle tones can be influenced by a throttle point with variable flow cross-section, which is disposed in the gas supply line associated with the valve.

The frequency, once adjusted with the aid of the throttle, is not adjusted during the entire time that the respirator is worn. Suitable sound-generating signal whistles are for example lip or reed whistles.

If several respirator wearers must work jointly at a site, and if on one of them the known alarm signal is sounded, indicating a low pressure condition, the wearers cannot distinguish whether their alarm has sounded on their respirator or the alarm of another wearer has sounded. Checking his own gas supply after occurrence of an alarm signal, for example by visual inspection of the supply pressure gauge, is not possible for the wearer working with a gas mask and under difficult viewing conditions which are often encountered. The wearer must often work in smoke or darkness or lenses of his mask may be fogged on the outside.

SUMMARY OF THE INVENTION

It is the object of the invention to improve the alarm device for respirators of the kind mentioned above, in such a way that the respirator wearer is able to check, by means of a device, whether a warning signal he has heard comes from his own equipment or not.

This problem is solved in that the device has a manipulator which adjusts the sound-generating region of the whistle. In this way, when the wearer hears a whistle he manipulates his equipment and if the whistle changes, he knows that the whistle came from his equipment.

After the wearer of a respirator with the alarm device according to the invention has established by means of this simple manipulation, that his own equipment is sounding the alarm, he alone must see to it that his respiratory gas supply is replenished. The other wearers working in a team with him can stay at their place of work after they have determined by the same manipulation that their own equipments did not generate the warning signal, so that an unnecessary interruption of the work is avoided.

Accordingly another object of the invention is to provide an alarm device for respirators having alarm means for supplying a flow of gas when the pressure of a gas supply in the respirator falls below a selected value, comprising a receiving connection for receiving the flow of gas from the alarm means, a signal whistle connected to said receiving connection for receiving the flow of gas and generating a whistle signal thereupon, and manipulator means having at least one part movable with respect to said receiving connection to change said whistle signal whereby a wearer of the respirator after hearing the whistle signal can manually move said at least one part to change the whistle signal and verify that the whistle signal is coming from the wearer's alarm device.

A further object of the invention is to provide such an alarm device wherein the signal whistle includes a whistle sleeve connected to the receiving connection.

According to other features of the invention, it is especially advantageous to arrange the entire whistle sleeve so as to be displaceable, to cover the gas outlet opening of the whistle by means of the device, or to change its resonance chamber by means of a displaceable ram. Another advantageous possibility consists in adjusting a stop abutting the sound-generating reed.

A further object of the invention is to provide an alarm device which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the invention are described below with reference to the drawings wherein.

DESCRIPTION OF THE PREFERRED EMBODIMENTS

Figure 1:
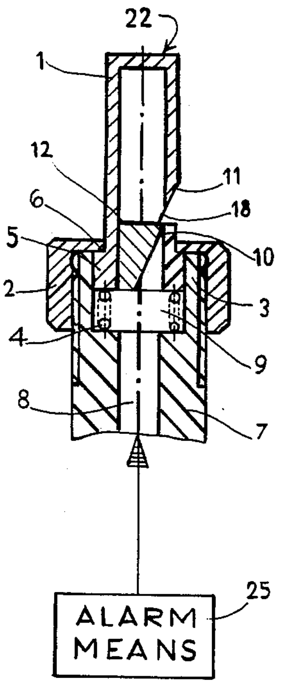
FIG. 1 is a sectional view of an alarm device with a lip whistle.

In FIG. 1 the sound-generating area of a whistle 22 consists of a whistle sleeve 1 with a flow channel 10 and lip 11, which is held in a housing 2 and guided displaceably in a receiving part 3 of a supply block or receiving connection 7. A helical spring 4 pushes the whistle sleeve 1 into an end position, in which a shoulder 6 of a sleeve collar 5 abuts against the housing 2. In the supply block 7 an air supply channel 8 is recessed. From this channel 8, pressure gas is passed in the interior 9 through the flow channel 10 against the lip 11 when a presettable minimum value for the gas pressure in the respirator has been reach, whereby a signal tone is generated. If, in its receiving part 3, sleeve 1 is pressed into the interior 9 from its end position counter to the spring pressure, the gas outlet opening 18 between lip 11 and an insert 12, is closed, so that the passage of air and hence the generation of sound is interrupted.

To operate the embodiment of FIG. 1, when the wearer hears a whistle signal, he simply pushes down on the whistle sleeve 1. This automatically stops or changes the whistle signal and verifies to the wearer that in fact his alarm device has sounded.

In the following the same reference numerals are utilized to designate the same or similar parts.

Figure 2:
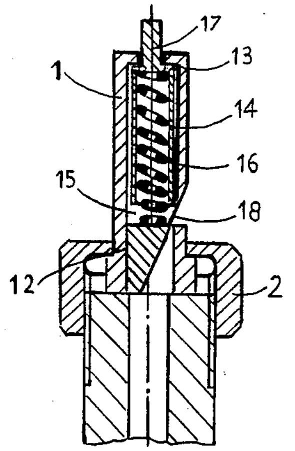
FIG. 2 is a sectional view of another alarm device with a lip whistle.
Figure 3:
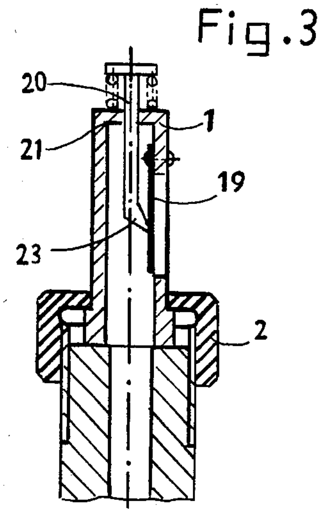
FIG. 3 is a sectional view of an alarm device with a reed whistle.

In FIG. 2. the whistle is arranged in a fixed manner in housing 2. A ram 13 with a guide sleeve 14 is displaceably arranged in the interior 15 of the whistle. A helical spring 16 engages between the insert 12 and the inside face of ram 13. If the guide sleeve 14 is displaced at its shank 17 counter to the spring force, the clearance of the gas outlet opening 18 and hence the acoustic signal is changed. Upon complete depression of sleeve 14 the gas outlet opening 18 is closed, and the acoustic signal is silenced. A variation of the acoustic signal is achieved also in that only the ram 13 is arranged displaceably in the whistle sleeve 1. In both cases the displacement of ram 13 results in a variation of the resonance chamber 15 and hence a variation of the acoustic signal In FIG. 3 a reed whistle is shown with a reed 19 attached to the whistle sleeve 1, the reed being variable in its free resonance length by displacement of the rod 20. Depending on the position of rod 20, which is displaceably mounted in the bushing 21, the point of contact of stop 23 with reed 19 is displaced and a correspondingly different acoustic signal is produced.

While specific embodiments of the invention have been shown and described in detail to illustrate the application of the principles of the invention, it will be understood that the invention may be embodied otherwise without departing from such principles.

What is claimed is:

1. An alarm device device for respirators having alarm means for supplying a flow of gas when the pressure of a gas supply in the respirator falls below a selected value, comprising a receiving connection for receiving the flow of gas from the alarm means, a signal whistle connected to said receiving connection for receiving the flow of gas and generating a whistle signal thereupon, said whistle further comprising a whistle sleeve, at least a portion of which is mounted for movement relative to said receiving connection, said whistle sleeve having a gas outlet opening for the passage of the whistle signal, said receiving connection having a portion which, with movement of said portion of said whistle sleeve, at least partially blocks said gas outlet opening to change said whistle signal, whereby a wearer of the respirator after hearing the whistle signal can manually move said at least one portion to change the whistle signal and verify that the whistle signal is coming from the wearer's alarm device when said wearer is among a plurality of wearers of similar alarm devices.

2. An alarm device according to claim 1, including a spring biasing said whistle sleeve into an operative position for passage of the whistle signal, said sleeve being movable into a different position against biasing of said spring for changing said whistle signal.

3. An alarm device according to claim 1, wherein said whistle sleeve is fixedly connected to said receiving connection and has a gas outlet opening for the passage of said whistle signal, wherein said portion of said whistle sleeve further comprises a movable element movably mounted in said sleeve, a spring engaged with said element for biasing said element into an operative position with respect to said gas outlet opening for free passage of said whistle signal, said element being movable out of its operative position for at least partially changing said gas outlet opening for changing said whistle signal.

4. An alarm device according to claim 1, wherein said whistle sleeve is fixed to said receiving connection and has a gas outlet opening for said whistle signal, said sleeve defining a resonance chamber therein for said whistle signal, a ram movably mounted in said sleeve and movable in said resonance chamber for changing said resonance chamber to change said whistle signal, and spring means biasing said ram into an operative position whereat said whistle signal is generated, said ram being movable out of said operative position for changing said whistle signal.

5. An alarm device for respirators having alarm means for supplying a flow of gas when the pressure of a gas supply in the respirator falls below a selected value, comprising a receiving connection for receiving the flow of gas from the alarm means, a signal whistle connected to said receiving connection for receiving the flow of gas and generating a whistle signal thereupon, and manipulator means having at least one part movable with respect to said receiving connection to change said whistle signal, said whistle further comprising a sleeve fixed to said receiving connection and having a gas outlet opening, a reed connected to said sleeve and engageable at least partly over said gas outlet opening, said sleeve vibrating with the flow of gas for generating said whistle signal, said manipulator means comprising adjustable stop means engageable with said reed for changing said whistle signal, whereby a wearer of the respirator after hearing the whistle signal can manually move said at least one part to change the whistle signal and verify that the whistle signal is coming from the wearer's alarm device when said wearer is among a plurality of wearers of similar alarm devices.

6. An alarm device according to claim 5, wherein said adjustable stop means comprises a stop element movably mounted to said sleeve and engaged against said reed, and biasing means biasing said stop element into an operative position whereat said reed generates said whistle signal, and being movable out of said operative position for changing said whistle signal.

* * * * *